United States Patent [19]

Brisson

[11] Patent Number: 5,029,522

[45] Date of Patent: Jul. 9, 1991

[54] COMPACTOR FOR RECYCLABLE WASTE MATERIALS

[76] Inventor: David J. Brisson, 104 Dalmar Dr., Kingsford, Mich. 49801

[21] Appl. No.: 469,197

[22] Filed: Jan. 24, 1990

[51] Int. Cl.[5] .......................... B30B 7/00; B60P 1/00; B65F 3/00

[52] U.S. Cl. .................................. 100/233; 100/218; 414/525.5; 414/525.51

[58] Field of Search .............................. 100/233, 218; 414/525.51, 525.52, 525.5

[56] References Cited

U.S. PATENT DOCUMENTS

| | | | |
|---|---|---|---|
| 3,462,031 | 8/1969 | Weir | 100/218 |
| 3,662,908 | 5/1972 | Boda | 100/233 |
| 3,739,927 | 6/1973 | Gollnick | 100/233 |
| 3,999,669 | 12/1976 | Smith | 100/233 |
| 4,892,454 | 1/1990 | Behling et al. | 100/233 |

*Primary Examiner*—Paul T. Sewell
*Assistant Examiner*—M. D. Patterson
*Attorney, Agent, or Firm*—Andrus, Sceales, Starke & Sawall

[57] ABSTRACT

A compacting apparatus for recyclable waste materials is particularly adapted to be mounted on a recycling collection vehicle to allow the additional collection of large volume recyclable containers, such as large plastic beverage bottles and the like. The compactor apparatus occupies a very small total volume, but provides a highly efficient compaction of the recyclable materials thereby allowing it to be added to existing vehicles without significantly increasing the overall size. The appartus utilizes a flow-through arrangement including an inlet hopper on one end of the housing and a serially connected payload chamber having an outlet on the opposite end of the housing. A hopper platen is rotatably mounted on one end of a slide panel for sequential rotary and linear movement to sweep uncompacted materials from the hopper and compact them into the payload chamber. A load ejection panel is rotatably mounted in the payload chamber to cooperate with the slide panel in one position to establish the front wall of the chamber and to rotate to a second position to eject the compacted mass through a rear door in the housing. The payload chamber has a unique forwardly divergent interior shape to help prevent reverse movement of compacted material from the payload chamber back into the hopper. The rear ejection door in the housing is preferably connected with a direct mechanical link to the load ejection panel so that the two operate in unison for load discharge, thereby eliminating the potential problem of the rear door inadvertently springing open under the pressure of the compacted material.

17 Claims, 3 Drawing Sheets

FIG. 3
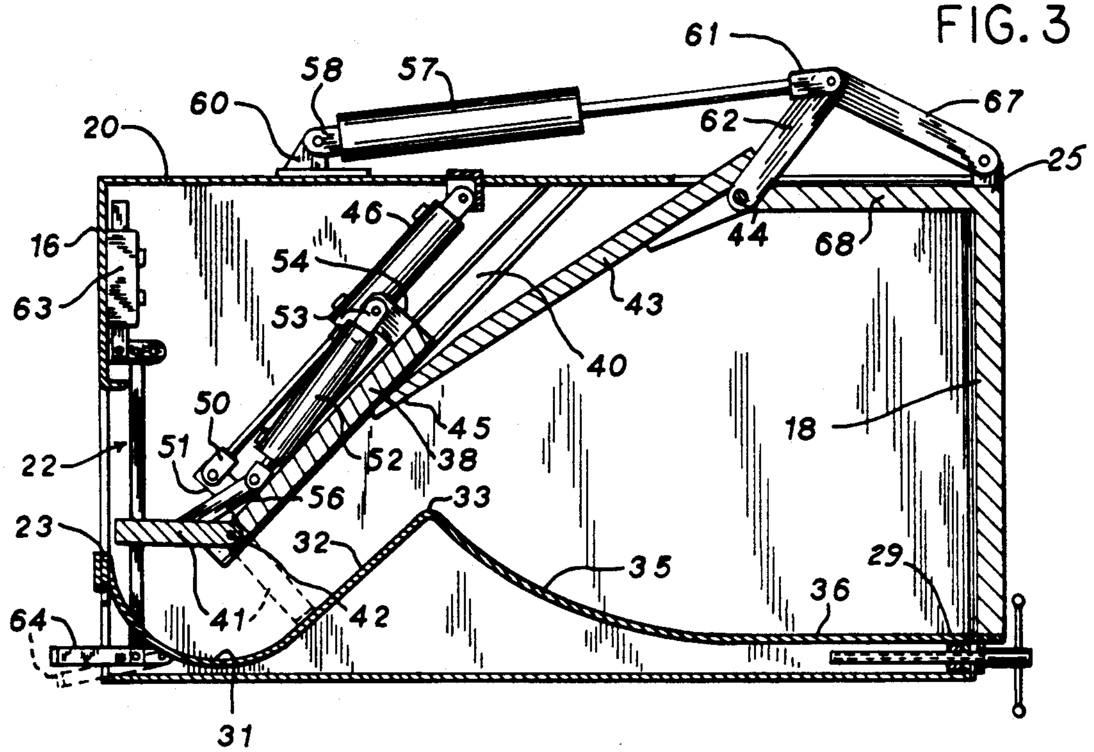
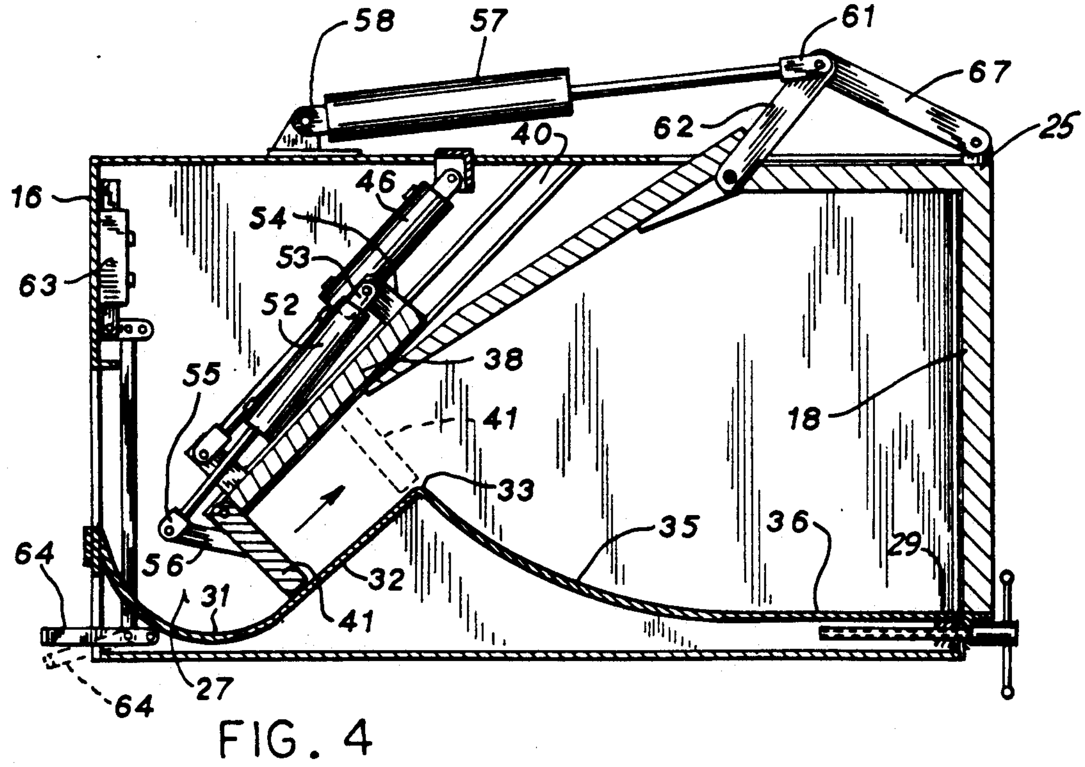
FIG. 4

FIG. 5
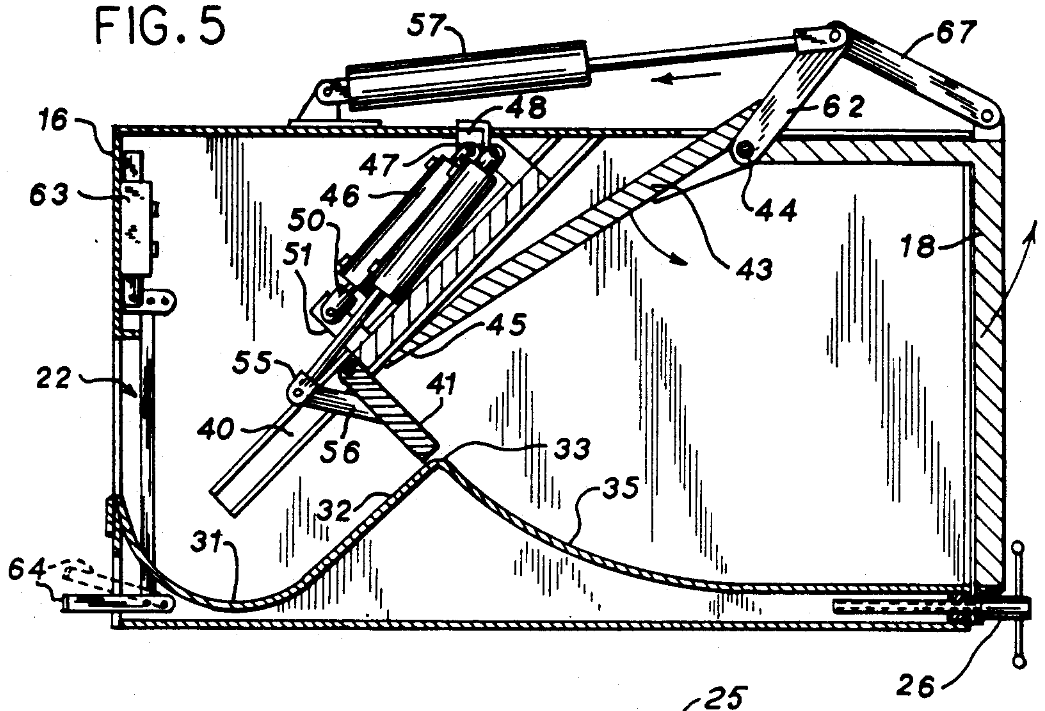
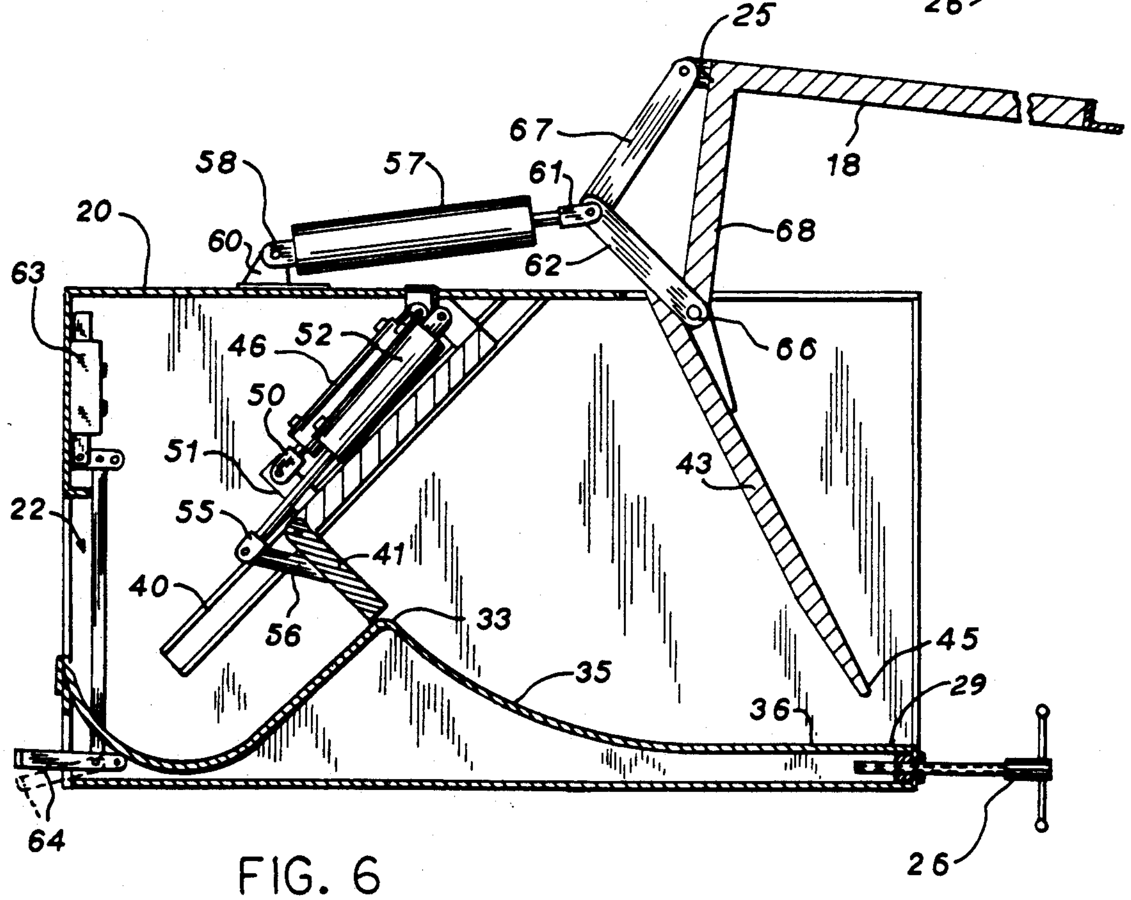
FIG. 6

COMPACTOR FOR RECYCLABLE WASTE MATERIALS

BACKGROUND OF THE INVENTION

The present invention relates to an apparatus for compacting recyclable waste materials and, more particularly, to a mobile compacting apparatus for the collection of separable plastic or metal containers by a vehicle operating along a collection route.

The importance of recycling waste materials has become particularly significant in view of the increasing shortage of adequate landfill space, as well as the obvious benefits in saving resources by recycling materials of various kinds. As a result, there are significant changes in the manner in which trash and waste materials are collected from residential, commercial, and other sources. Prior to the trend toward the segregation of trash at the point of collection, collection trucks typically included large storage chambers into which mixtures of trash of all kinds were loaded, compacted on route, and unloaded by dumping the entire load at a common dropoff point. More recently, the desire to recycle waste materials has led to programs requiring the segregation of certain common materials at curb side or other collection point from which they are loaded into vehicles having separate compartments for each type of recyclable material. For example, waste materials such as newsprint, glass, metal containers and plastic containers, or some combination thereof, are segregated for collection in a vehicle having a separate compartment for each type of material.

Vehicles for the collection of recyclable materials may include apparatus for compaction on route, but more typically, include separate open storage compartments each of which is sized in accordance with the average anticipated volume of each recyclable material to be collected. For example, noncompacting trucks presently used for the collection of recyclable materials may have a total capacity of approximately 30 cubic yards of uncompacted materials. The most common recyclable materials presently collected include newsprint, glass, and metal containers. The collection bodies of the vehicles are then divided into three or more compartments with volume allocations of approximately 20 cubic yards for newsprint, 6 cubic yards for glass, and 4 cubic yards for metal containers. Both steel and aluminum containers may be mixed in one compartment or, that compartment may be subdivided into separate compartments of approximately 2 yards each for the separation of steel and aluminum containers.

The recycling of plastic containers has also become increasingly significant and attempts have been made to segregate them at the point of collection as well. However, particularly because of the tremendously large uncompacted volume occupied by plastic containers, there is little or no available space on a typical collection vehicle to accommodate these materials. In proportion to the volume of storage space required for other recyclable materials, uncompacted plastic containers of various types would require approximately 10–12 cubic yards of additional storage space. Adding this volume to a conventional 30 cubic yard body would result in a vehicle much too large and too slow moving to be cost effective, particularly along residential routes. If the space required for plastic container collection were taken pro rata from the other three compartments, the reduction in volume available for storage of these materials would also significantly reduce the overall collection efficiency of the vehicle. Thus, plastic containers are best and most efficiently recycled by the use of compartmentalized compaction, thereby reducing the amount of space which need be allocated to plastic container collection. Similarly, segregated steel and aluminum containers could likewise be handled efficiently by compartmentalized compaction. Newsprint is typically not as compressible as containers, and glass containers cannot be economically crushed and compacted on route because of the need to sort them by color to obtain the most value from the recycling of glass. Thus, compartmentalized compaction of newsprint and glass is not practical and, therefore, a recycling vehicle should have the capability of providing both compacting and non-compacting collection of recyclable waste materials.

The prior art is replete with refuse collection vehicles which utilize a rear loading hopper from which loaded refuse is swept forwardly into a storage or payload chamber and compacted therein. The rear loading hopper is pivotally attached to the payload chamber to allow rear discharge of the compacted mass. Rear discharge of the compacted mass may be effected by a rearwardly displaceable hydraulic ram or by tilting the storage chamber for gravity discharge. U.S. Pat. Nos. 3,615,028; 3,682,336; 4,073,393; 4,180,365; and 4,551,055 all show refuse collection trucks of this type, none of which is readily adaptable to use as a recycling collection vehicle for various kinds of recyclable materials.

U.S. Pat. No. 3,462,031 shows a compacting refuse collection vehicle divided into a loading compartment and a compaction/storage compartment in which the loading compartment is pivoted upwardly to dump its contents into the compaction compartment where a packer blade continues movement of the refuse in the same direction and compacts it against the opposite end of the body. The compaction blade also operates to eject the compacted payload when an outlet door opposite the loading hopper is opened. U.S. Pat. Nos. 4,005,789 and 4,260,316 also show compacting refuse collection vehicles in which the collected material moves longitudinally through the unit from a loading hopper into a payload chamber where it is compressed against an outlet door on the opposite end. These devices are intended for handling heterogeneous trash mixtures of relatively large volumes in a manner more or less conventional in the prior art.

U.S. Pat. No. 4,242,953 shows an apparatus for separate collection of both disposable and recyclable materials. The recyclable fraction, such as paper, is baled by pushing it forwardly from the rear and includes lateral discharge of the compacted bales. The disposable fraction is also pushed forwardly by a reciprocable blade toward a lateral discharge door on the forward end of the collection compartment. The disposable fraction is discharged by sidewise tilting of the storage compartment.

There remains a need in the industry for a compacting apparatus which is particularly adaptable for the collection and compaction on route of high volume, low density recyclable materials, such as plastic containers, as well as metal containers of both aluminum and steel. The compactor should be adaptable for incorporation into recycling collection vehicles of the type utilizing compartments for the non-compacting collection of other types of recyclable materials, such as newsprint and glass. Such a recycling apparatus should most desirably occupy a minimum total volume of space on the collection vehicle and yet provide a capacity for handling a large volume of recyclable containers. Also, the apparatus must be adaptable for convenient location and easy operation on the collection vehicle so as not to unduly complicate or add substantial additional time to the collection cycle.

SUMMARY OF THE INVENTION

In accordance with the present invention, there is disclosed hereinafter a compactor for recyclable waste materials which is particularly adaptable for collection and compaction on route of large plastic beverage containers and the like. The compactor apparatus may be mounted on a conventional refuse collection truck chassis where it occupies relatively little total volume. The compactor apparatus may be utilized along with conventional noncompacting compartments for other recyclable materials, and similar compacting apparatus may also be provided for the collection and compaction of metal containers, made either of aluminum or steel.

The compacting apparatus of the present invention includes a generally rectangular housing having an inlet opening in one end wall for the receipt of uncompacted material, e.g. empty plastic or metal containers, and an outlet opening in the opposite end wall of the housing for the discharge of the compacted material. Within the housing adjacent the inlet opening is an inlet hopper having a lower floor panel extending between the opposite sidewalls of the housing, which floor panel includes an arcuate floor portion extending from the inlet opening toward the outlet opening. Also within the housing and contiguous with the inlet hopper is a payload chamber having a floor panel which also defines an arcuate floor portion. The inlet hopper and payload chamber floor panels are joined and share a common edge. A slide panel is mounted in the housing between the sidewalls and is adapted for reciprocal movement between a lower position and an upper position in a plane perpendicular to the housing sidewalls and extending upwardly from the inlet hopper toward the outlet end of the housing. The slide panel generally lies above and spaced from the common edge between the inlet hopper and the payload chamber. A rectangular hopper platen is pivotally attached at one edge to the lower edge of the slide panel and is rotatable about the lower edge of the slide panel in its lower position to sweep uncompacted materials from the arcuate floor portion of the hopper toward the payload chamber and, thereafter, to move linearly with the slide panel to its upper position to push and compact the material into the payload chamber. Within the payload chamber there is pivotally mounted an ejection panel which is rotatable from a first position in which it cooperates with the slide panel to define one wall of the payload chamber to a second position which discharges the compacted material through the outlet opening. The outlet opening is provided with a closure which is operable to retain the material in the payload chamber until the chamber is full of compacted material, which closure is then opened to allow discharge of the compacted material. Suitable power means are provided for effecting sequential operation of the slide panel, the hopper platen and the ejection panel. A link is preferably also provided between the ejection panel and the closure for the outlet opening for simultaneous operation thereof.

In the preferred embodiment, the inlet hopper floor panel includes a tangent portion extending from one end of the first arcuate portion to the common edge with the payload chamber. The tangent portion is positioned to lie parallel to the slide panel such that the hopper platen moves along the tangent portion as it moves linearly with the slide panel to its upper position. The arcuate floor portion of the inlet hopper is preferably semicylindrical and has a radius approximately equal to the length of the hopper platen. Similarly, the tangent portion of the hopper floor panel is preferably spaced from the slide panel by a distance approximately equal to the length of the hopper platen. In this manner, the platen will move with its free outer edge closely spaced from the floor panel through the full extent of the platen rotary and linear movement effecting, respectively, the sweeping of material from the hopper and movement or compaction thereof into the payload chamber.

The hopper platen is rotatable in the opposite direction to its pre-sweeping position after the slide panel has reached its upper position at the end of its path of linear movement. However, the hopper is preferably loaded while the platen is in the position at the end of its compaction stroke and before rotation back to its pre-sweeping position. The hopper may also be loaded when the hopper platen has been rotated back to this position. When the slide panel is subsequently moved linearly to its lower position, the free edge of the platen is positioned closely adjacent the lower edge of the housing inlet to close the inlet opening just prior to sweeping rotation and linear compaction movement of the platen.

In the preferred embodiment, the ejection panel is pivotally attached by its upper edge to the upper portion of the housing and, in its first position, the ejection panel extends downwardly generally along the slide panel such that the ejection panel overlaps at least a portion of the slide panel, even when the slide panel is in its lower position and displaced the greatest distance from the ejection panel pivot. During rotation of the ejection panel to its second position, the lower edge of the panel moves along closely spaced from the arcuate floor portion of the payload chamber. The arcuate floor portion of the payload chamber is preferably semicylindrical. The payload chamber floor panel includes a tangent portion which extends between the arcuate portion and the housing outlet opening. The tangent portion is positioned along the bottom of the housing in a horizontal plane and has an edge portion coincident with the lower edge of the outlet opening in the housing.

The slide panel preferably operates in a pair of slide tracks which are attached to the interior sidewalls of the housing. The power operating means includes a first fluid cylinder which interconnects the slide panel and the hopper platen for rotating the platen to and from its initial position. The power operating means also includes a second fluid cylinder which interconnects the slide panel and the housing to provide the reciprocal sliding movement of the slide panel on the slide tracks between the upper and lower positions. Finally, the power operating means also includes a third fluid cylinder which interconnects the ejection panel and the housing to provide reciprocal pivotal movement of the ejection panel between its first and second positions. As previously indicated, operation of the third fluid cylinder to move the ejection panel may also be utilized to open a hinged door which comprises the closure for the housing outlet.

BRIEF DESCRIPTION OF THE DRAWINGS

FIG. 3 is a sectional side elevation, similar to FIG. 2, showing the slide panel and attached hopper platen moved to the slide panel lower position to close the inlet opening to the housing.

FIG. 4 is a view similar to FIG. 3 showing the hopper platen after rotation from its initial position to sweep the uncompacted material from the inlet hopper.

FIG. 5 is a view similar to FIGS. 2–4 but showing the slide panel moved to its upper position and carrying the hopper platen therewith through its compaction stroke.

FIG. 6 is a view similar to FIG. 5 showing rotation of the ejection panel to the load discharge position.

DETAILED DESCRIPTION OF THE PREFERRED EMBODIMENT

Figure 1:
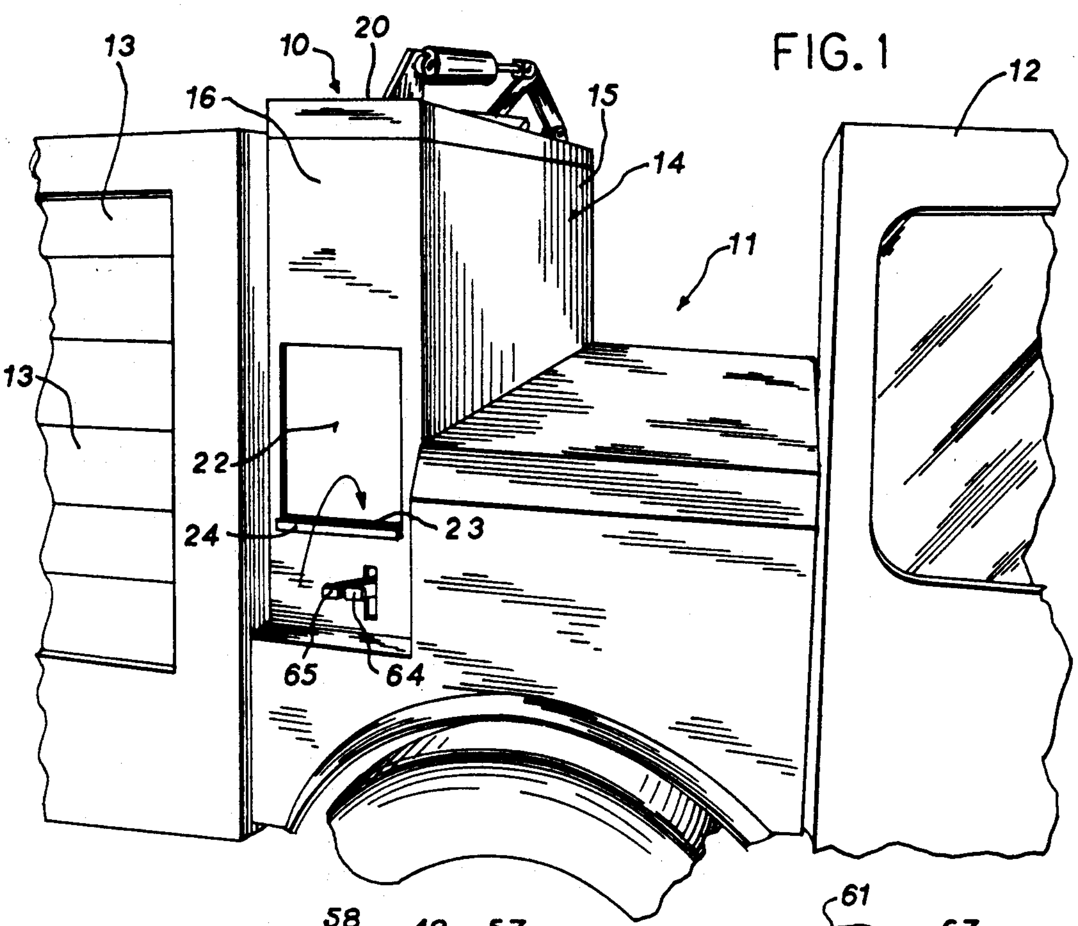
FIG. 1 is a perspective side view of a portion of a vehicle used in the collection of recyclable materials showing the installation of the compactor apparatus of the present invention thereon.
Figure 2:
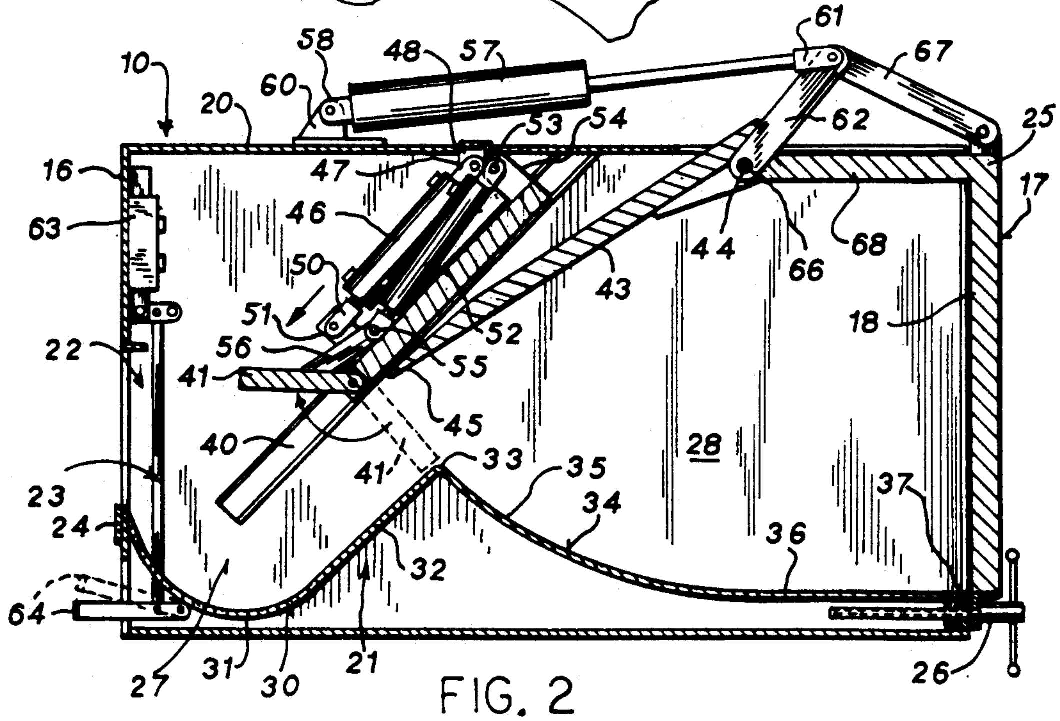
FIG. 2 is a sectional side elevation of the compacting apparatus of the present invention showing the slide panel in its upper position and the hopper platen in its initial position prior to commencement of movement to close the hopper.

Referring to FIG. 1, the compacting apparatus 10 of the present invention is particularly adapted for use on a waste collection vehicle and, more particularly, a collection vehicle of the type used in the route pickup of recyclable waste materials. The compacting apparatus 10 is adaptable for installation on the chassis of a collection truck 11 and, as shown, may be mounted between the cab 12 and other rearwardly disposed collection compartments 13. The compacting apparatus is adapted to be installed across the chassis of the truck 11, such that the material flow therethrough is from one side of the truck to the other, as will be described in greater detail hereinafter. However, with respect to the construction and operation of the compaction apparatus per se, the following description will refer to front and back or forward and rearward directions, which directions are referenced to the direction of material flow through the apparatus from front to back and are actually normal to the orientation of the truck.

Referring also to FIGS. 2–6, the compacting apparatus 10 is substantially contained within a generally rectangular housing 14 which includes a pair of opposite sidewalls 15, a forward end wall 16, a rear end wall 17 (comprising an openable door 18), a top wall 20, and a floor 21. The forward end wall 16 is provided with an inlet opening 22 of generally rectangular shape which includes a lower edge 23. The lower edge 23 of the inlet opening may be provided with a reinforced loading lip 24. The opposite rear end wall 17 comprises the door 18 which is hinged at an appropriate point adjacent its upper edge 25 to pivot from a closed position shown in FIGS. 2–5 to the open position shown in FIG. 6. In a preferred embodiment, the hinged connection is disposed forwardly of the door and connected with a suitable link which will be described hereinafter. The door may be secured in its closed position with a conventional lock screw apparatus 26 or any other suitable latching mechanism.

The floor 21 of the housing 14 is divided into two portions to generally define, with the interior of the housing, a forward inlet hopper 27 adjacent the inlet opening 22 and a rearward payload chamber 28 extending generally from the inlet hopper to the rear outlet door 18. The entire floor 21 extends between the side walls 15 and is perpendicular thereto. An inlet hopper floor panel 30 includes an arcuate floor portion 31 extending rearwardly from the lower edge 23 of the inlet opening 22. Preferably, the arcuate floor portion is semicylindrical. The hopper floor panel 30 also includes a tangent portion 32 extending upwardly and rearwardly from the end of the arcuate portion 31. The upper edge of the tangent portion 32 forms a common edge 33 with a payload chamber floor panel 34. The payload chamber floor panel 34 includes an arcuate floor portion 35 extending downwardly and rearwardly from the common edge 33 and a horizontally extending tangent portion 36 which terminates at the rear of the housing where it coincides with the lower edge 37 of the outlet opening 29.

Thus, the inlet hopper 27 comprises a generally concave receptacle extending between the lower edge 23 of the inlet opening and the common edge 33 with the payload chamber floor panel 34. In one embodiment, the compactor housing 14 may be approximately 16 inches wide and the inlet hopper capacity is sufficient to contain approximately 16 empty and uncompacted two liter plastic beverage containers when filled to or slightly above the levels of the loading lip 24 and interior common edge 33. The space in the interior of the housing above the inlet hopper is occupied by the operating mechanism and various hydraulic controls to be described hereinafter. The payload chamber 28 occupies the greater portion of the total volume of the housing. It provides a payload capacity of about 0.6 cubic yard of compacted plastic containers or other materials. The total length of the housing 14 (across the width of the vehicle on which it is mounted) is typically 96 inches. Correspondingly, the housing may be 48 inches high (or higher), not including the exterior hydraulic cylinder to be described. Thus, it will be appreciated that the entire compacting apparatus 10 occupies a very small total volume which allows it to be mounted on a conventional recycling collection vehicle without any significant loss of space or capacity and yet provides a payload capacity sufficient to handle a typical collection route.

A slide panel 38 is mounted inside the housing between the side walls 15 for reciprocal sliding movement between and upper position (FIG. 2) and a lower position (FIG. 3). The slide panel 38 is held for sliding movement in a pair of slide tracks 40 attached to opposite sidewalls and disposed such that the tracks and slide panel extend at an angle upwardly from the inlet hopper 27 and over the common edge 33 with the payload chamber 28. The slide panel 38 also forms portion of an interior wall which generally separates the inlet hopper and payload chamber.

A generally rectangular hopper platen 41 is pivotally attached by one edge to the lower edge of the slide panel 33 by a platen pivot 42. Thus, the hopper platen 41 is adapted to move linearly with the slide panel 38 and to rotate independently thereof about its pivot 42. The primary function of the hopper platen 41 is to sweep uncompacted materials (e.g. empty plastic or metal containers) from the arcuate floor portion 31 of the inlet hopper 27 when the slide panel 38 is in its lower position and to subsequently move linearly with the slide panel to its upper position to carry the uncompacted material from the inlet hopper and to compact it into the payload chamber 28.

A payload ejection panel 43 is pivotally mounted within the payload chamber 28 and is rotatable about an ejection panel pivot 44 extending between the housing side walls near the top wall 20 from a first position adjacent the slide panel 38 to a second position adjacent the housing outlet opening 29 to cause the compacted materials to be ejected from the housing. When the ejection panel 43 is in its first position its free lower edge 45 overlaps the slide panel, whether the latter is in its upper or lower position, such that the ejection panel and slide panel form a continuous angularly disposed payload chamber forward wall.

The arcuate floor portion 35 of the payload chamber floor panel 34 is preferably semicylindrical and disposed concentrically with the arc of rotation of the lower edge 45 of the ejection panel, such that movement of the ejection panel from its first to its second position will cause it to sweep closely adjacent the payload chamber floor panel through the major portion of its arc. Prior to payload ejection, the door 18 is securely latched, as with the lock screw 26, to provide the necessary resistance to materials pushed into the payload chamber by linear movement of the hopper platen to effect the necessary compaction.

Movement of the slide panel 38 and hopper platen 41 are preferably effected by an arrangement of hydraulic cylinders operable from a forward control panel adjacent the housing inlet opening 22. The ejection panel 43 is preferably operated by a control lever at the rear of the housing adjacent the door 18. A slide panel cylinder 46 is pivotally mounted by a cylinder end clevis 47 to a mounting bracket 48 on the interior of the housing adjacent the top wall 20. The cylinder 46 includes a rod end clevis 50 which is pivotally attached to an upstanding lug 51 secured to the lower end of the slide panel 38. Extension of the cylinder rod results in movement of the slide panel along slide tracks 40 between its upper and lower positions.

In the preferred embodiment, a pair of platen cylinders 52 are mounted, one on each side of the slide panel cylinder 46. Each platen cylinder 52 is pivotally attached by its cylinder end clevis 53 to an upper lug 54 on the slide panel 38. The rod end of each platen cylinder 52 is provided with a clevis 55 which is pivotally attached to a pivot bracket 56 secured to the hopper platen 41. Extension of the rods of the platen cylinders 52 causes the hopper platen 41 to pivot about the platen pivot 42 from its first to its second position when the slide panel 38 is in either its upper position or its lower position.

An ejection panel cylinder 57 is mounted exteriorly of the housing 14 and includes a cylinder end clevis 58 pivotally attached to a mounting bracket 60 secured to the top wall 20 of the housing. The rod end clevis 61 of the ejection panel cylinder is pivotally attached to an integral pivot bracket 62 on the ejection panel 43 extending outwardly from the ejection panel pivot 44. Retraction of the rod of the ejection panel cylinder 57 causes the panel to rotate rearwardly about its pivot 44 from the first position to its second ejection position.

Hydraulic fluid for operation of the various cylinders 46, 52 and 57 may be supplied by the hydraulic pump located on the vehicle 11 and also used for operating the other hydraulic systems. The slide panel cylinder 46 and platen cylinder 52 are preferably operated in an automatically sequenced manner. Referring initially to FIG. 5, the inlet hopper 27 is preferably loaded with the hopper platen 41 positioned at the end of its compaction stroke with the slide panel 38 in its upper position and the platen lying generally tangent to the cylindrical portion 35 of the payload chamber floor panel. In this manner, any latent spring-back in material previously compacted into the payload chamber will not be allowed to force materials rearwardly from the chamber back into the hopper. After the hopper has been loaded to a level generally defined by the lower edge 23 of the inlet opening and the common edge 33 between the hopper and the payload chamber, the platen cylinder 52 is retracted and the hopper platen 41 rotates clockwise from its FIG. 5 position to its FIG. 2 position where it is then positioned to initialize the hopper clearing and compaction cycle. It should also be noted that bottles, containers and other materials may also be loaded into the hopper 27 when the hopper platen 41 is in the FIG. 2 position, especially if there is a small initial volume of materials in the payload chamber such that they are not likely to be forced back into the hopper.

A hydraulic control mechanism 63 for operating the slide panel cylinder 46 and platen cylinders 52 is mounted inside the housing on the forward end wall 17. A pair of manually operable control levers 64 and 65 are operatively connected to the hydraulic control 63 and extend through the forward end wall below the loading lip 24 for ready access by an operator standing alongside the truck. Each of the control levers 64 and 65 operates a conventional threeway spool valve in the hydraulic control mechanism 63 to extend and retract one of the cylinders. Each of the spool valves is configured with a spring-loaded detent mechanism to hold the spool in either of its positions to extend or retract its cylinder in response to upward or downward movement of its related control lever until a preset hydraulic pressure limit has been reached. When the pressure limit is reached, the detent is tripped and the valve is biased to its neutral position. In the presently preferred control system, with the inlet hopper 27 filled and the hopper platen 41 and slide panel 38 in the FIG. 5 position showing completion of the compaction stroke, both control levers 64 and 65 are moved manually upward from their neutral positions. The valves are sequenced such that the platen cylinders 52 are first retracted to cause the hopper platen to pivot in a clockwise direction over the materials in the hopper to its initial position shown in FIG. 2. When the platen cylinder rods are fully retracted and bottom out, the hydraulic pressure will increase to the preset limit (e.g. 1200 psi) and the spool will be released and returned to its neutral position. Hydraulic fluid will then bypass the first spool valve and flow through the second spool valve causing the slide panel cylinder 46 to extend and move the slide panel 38 from its upper FIG. 2 position to its lower FIG. 3 position, carrying of course the hopper platen with it. When the slide panel cylinder 46 is fully extended, the hydraulic pressure will increase until it reaches the second preset limit (e.g. 1400 psi) which releases the second spool which is biased to return to neutral and all movement of the cylinders is halted. In the FIG. 3 position, the free edge of the hopper platen is spaced a few inches from the loading lip 24 with the gap providing adequate clearance to assure that the operator's hands and fingers are clear before the hopper sweep and compaction portion of the cycle is commenced.

To continue the cycle, the operator moves both control levers 64 and 65 down from the neutral position causing the first valve spool to move in the opposite direction, resulting in extension of the platen cylinders 52 and rotation of the hopper platen 41 about its pivot 42 to sweep the materials in the hopper rearwardly toward the payload chamber until the platen reaches the FIG. 4 position. When the platen cylinders are fully extended, the hydraulic pressure increases sharply and the spool is released to return to its neutral position, halting the flow of hydraulic fluid into the platen cylinders. The hydraulic fluid is automatically diverted to the second spool valve which is already in a position to cause the slide panel cylinder 46 to retract, resulting in upward movement of the slide panel and attached upper platen through the compaction stroke to the FIG. 5 position. When the hydraulic pressure in the cylinder reaches the preset limit, the valve spool will be released to return to a neutral position. The hydraulic pressure limit may result either from the slide panel cylinder 46 reaching the end of its stroke or from the resistance created by a compacted payload of material in the payload chamber. If the hydraulic pressure limit is reached prior to end of the compaction stroke and the spool tripped to return to neutral, the operator is provided with an indication that the payload chamber is full and must be emptied.

The radius defined by the length of the hopper platen 41 as it rotates about its pivot 42 is approximately equal to the radius of the semicylindrical floor portion 31 of the hopper. Similarly, the tangent portion 32 of the inlet hopper floor panel lies parallel to the slide panel 38 and at a distance therefrom approximately equal to the length of the hopper platen. In this manner, the platen travels through its rotary sweeping and linear compaction strokes with its edge closely spaced from the floor of the hopper to completely sweep all compactable materials therefrom.

As previously indicated, the payload ejection panel 43 extends downwardly and forwardly to overlap the slide panel 38 when the latter is in either its upper or lower position. In particular, when the slide panel is in its lower position (FIGS. 3 and 4), the ejection panel covers the gap between the upper edge of the slide panel and the top wall 20 of the housing to prevent material in the payload chamber from spilling over the slide panel and back into the forward portion of the housing. When the payload chamber is filled with fully compacted material, as sensed by the pressure limit set for the compaction stroke, the ejection panel cylinder 57 is activated to retract to causing the panel to rotate about its pivot 44 and to sweep the compacted load out through the open rear door 18. With the door unlocked, the force of the ejection panel on the compacted material may be used to cause the door to open by pivoting around its upper edge 25. However, it has been found that when utilized to compact plastic bottles and similar containers, the "memory" of the plastic results in a compacted mass in the payload chamber which tends to re-expand. Thus, if the door is unlatched by opening the lock screw 26, the spring-back of the plastic material may cause the door to rapidly fly open, thereby creating a potentially dangerous situation. Thus, it is preferable to mechanically link the ejection panel 43 to the door 18 such that the door may only be opened as a result of retraction of the ejection panel cylinder 57 and, even if the lock screw is open, the compacted load will not force the door open. Referring particularly to FIGS. 4 and 5, a connecting link 67 is pivotally attached at one end to the upper edge of the door 18 and at its opposite end to the common attachment between the rod end clevis 61 of the panel cylinder 57 and the pivot bracket 62 of the ejection panel. The upper edge of the door is provided with a pair of rigidly attached spaced legs 68 which extend forwardly for pivotal attachment to the ejection panel pivot 44. The ejection panel cylinder 57 may be operated in a manner somewhat similar to cylinders 46 and 52, but the control is preferably on the opposite end of the housing adjacent the door. With the rear door 18 linked to the ejection panel cylinder 57, as shown and described, the ejection panel 43 and door will rotate through equiangular arcs as the cylinder 57 is retracted.

As indicated previously, in the preferred mode of operation of the compacting apparatus of the present invention, the inlet hopper 27 is loaded with uncompacted materials (such as metal or plastic containers) with the hopper platen 41 and slide panel 38 disposed at the end of the compaction stroke (FIG. 5). In this manner, the platen prevents previously compacted material from springing back due to plastic memory into the hopper. To further prevent the spring back of material, the payload chamber 28 is specially shaped to help prevent compacted material from moving in a reverse direction when the hopper platen has been pivoted back to its initial position to commence another hopper sweeping and compaction cycle. The ejection panel 44 and payload chamber floor panel 34 converge toward the hopper platen and, even if the platen is rotated away from the inlet to the payload chamber, the compacted plastic material will tend to wedge between the converging surfaces to further restrict reverse movement into the loading hopper 27.

Although the compacting apparatus of the present invention has been particularly described for use in compacting recyclable plastic beverage containers, the apparatus is also useful for compacting recyclable containers made of other materials as well. Thus, cans made of aluminum and/or steel may likewise be readily compacted in an apparatus of the type described herein. The reduction in the volume or space normally required for non-compacting storage could be applied to increase the storage volume for other recyclable materials without increasing the overall storage volume of the collection apparatus.

Various modes of carrying out the present invention are contemplated as being within the scope of the following claims particularly pointing out and distinctly claiming the subject matter which is regarded as the invention.

We claim:

1. An apparatus for compacting recyclable waste materials comprising:

a housing of generally rectangular construction having an inlet for uncompacted material in one end wall of the housing and an outlet for compacted material in the opposite end wall of the housing;

an inlet hopper inside the housing and adjacent the inlet, said hopper having a floor panel including a first arcuate floor portion extending between and perpendicular to the side walls of the housing;

a payload chamber inside the housing contiguous with said inlet hopper and adjacent the outlet, said chamber having a floor panel including a second arcuate floor portion extending between and perpendicular to the side walls of the housing;

said inlet hopper and payload chamber floor panels having a common edge;

a slide panel slidably mounted between the housing side walls for reciprocal movement between a lower position and an upper position in a plane perpendicular to the side walls and extending at an angle upwardly from said inlet hopper toward the outlet end of the housing and over the common edge of the inlet hopper and payload chamber;

a rectangular hopper platen pivotally attached by one edge to the lower edge of said slide panel, said platen having an initial position from which it is rotatable to a second position to sweep uncompacted material from the first arcuate floor portion of said hopper toward said payload chamber when said slide panel is in its lower position and to move linearly with said slide panel to its upper position to compact the material into said payload chamber;

a payload ejection panel pivotally mounted within said payload chamber and rotatable from a first position in which said ejection panel and said slide panel cooperate to define the chamber wall opposite said outlet to a second position which causes the compacted material to be ejected through said outlet;

said ejection panel being pivotally attached by its upper edge to the upper portion of the housing and extending downwardly in its first position generally along said slide panel such that the lower edge of the ejection panel overlaps at least a portion of the slide panel when the latter is in either of its upper or lower positions;

a closure for said outlet operable to retain the material in the payload chamber until compacted; and, power means for effecting sequential operation of said slide panel, hopper platen and ejection panel.

2. The apparatus as set forth in claim 1 wherein said inlet hopper floor panel includes a tangent portion extending between said first arcuate portion and said common edge, said tangent portion lying parallel to said slide panel, such that said hopper platen traverses said tangent portion as it moves linearly with the slide panel to the upper position.

3. The apparatus as set forth in claim 2 wherein said first arcuate floor portion is semicylindrical and has a radius approximately equal to the length of said hopper platen.

4. The apparatus as set forth in claim 3 wherein said tangent portion is spaced from said slide panel by a distance approximately equal to the length of said hopper platen.

5. The apparatus as set forth in claim 1 wherein said hopper platen is rotatable in the opposite direction to its initial position when said slide panel is in its upper position.

6. The apparatus as set forth in claim 5 wherein the free edge of the hopper platen and the lower edge of the housing inlet define an inlet opening for loading access to the inlet hopper when said slide panel is in its upper position and said hopper platen is in either of its initial position or its second position.

7. The apparatus as set forth in claim 6 wherein the free edge of the hopper platen is positioned closely adjacent the lower edge of the housing inlet to close the inlet opening to the inlet hopper when said slide panel is in its lower position and said hopper platen is in its initial position.

8. The apparatus as set forth in claim 1 wherein the lower edge of said ejection panel moves along and closely spaced from the arcuate floor portion of said payload chamber as said ejection panel is rotated from its first position to its second position.

9. The apparatus as set forth in claim 8 wherein the arcuate floor portion of said payload chamber floor panel is semicylindrical.

10. The apparatus as set forth in claim 9 wherein said payload chamber floor panel includes a tangent portion extending between said arcuate portion and the housing outlet, said tangent portion positioned in a generally horizontal plane and having an edge portion coincident with the lower edge of the housing outlet.

11. The apparatus as set forth in claim 1 including a pair of slide tracks attached to the interior side walls of the housing positioned to support said slide panel for movement between its upper and lower positions.

12. The apparatus as set forth in claim 11 wherein said power means comprises a first fluid cylinder means interconnecting said slide panel and said hopper platen to effect rotation of the latter to and from its initial position.

13. The apparatus as set forth in claim 12 wherein said power means further comprises second fluid cylinder means interconnecting said slide panel and said housing to effect reciprocal sliding movement of said slide panel on said slide tracks between the slide panel upper and lower positions.

14. The apparatus as set forth in claim 13 wherein said power means comprises third fluid cylinder means interconnecting said ejection panel and said housing to effect reciprocal pivotal movement of said ejection panel between said first and second positions.

15. The apparatus as set forth in claim 14 wherein the closure for said housing outlet comprises a door having a hinged connection to the upper portion of the housing.

16. The apparatus as set forth in claim 15 wherein said third fluid power means includes a link between said ejection panel and said door to effect opening movement of the door in response to movement of said ejection panel from said first position to said second position.

17. The apparatus as set forth in claim 1 wherein the closure for the housing outlet comprises a door having a pivotal connection to the upper portion of the housing, and further comprising:

rigid link means interconnecting said ejection panel and said door for holding said ejection panel in said first position when said door is closed and for causing simultaneous pivotal movement of said panel and door when said panel is pivoted to said second position.

* * * * *